United States Patent
Wall et al.

(10) Patent No.: US 6,731,239 B2
(45) Date of Patent: May 4, 2004

(54) SYSTEM AND METHOD FOR RETRIEVING INFORMATION USING POSITION COORDINATES

(75) Inventors: Carroll Edward Wall, Ypsilanti, MI (US); John Whitacre, Dearborn Hts., MI (US)

(73) Assignee: Ford Motor Company, Dearborn, MI (US)

( * ) Notice: Subject to any disclaimer, the term of this patent is extended or adjusted under 35 U.S.C. 154(b) by 199 days.

(21) Appl. No.: 09/683,557

(22) Filed: Jan. 18, 2002

(65) Prior Publication Data

US 2003/0140056 A1 Jul. 24, 2003

(51) Int. Cl.[7] .............................................. H04B 7/185
(52) U.S. Cl. ............................ 342/357.1; 342/357.09
(58) Field of Search ................... 342/357.01, 357.09, 342/357.1; 455/456.1, 456.3, 457

(56) References Cited

U.S. PATENT DOCUMENTS

| | | |
|---|---|---|
| 5,296,861 A | 3/1994 | Knight |
| 5,347,546 A | 9/1994 | Abadi et al. |
| 5,355,140 A | 10/1994 | Slavin et al. |
| 5,438,337 A | 8/1995 | Aguado |
| 5,525,999 A | 6/1996 | King et al. |
| 5,541,606 A | 7/1996 | Lennen |
| 5,572,204 A | 11/1996 | Timm et al. |
| 5,654,717 A | 8/1997 | Nichols et al. |
| 5,678,169 A | 10/1997 | Turney |
| 5,686,910 A | 11/1997 | Timm et al. |
| 5,687,215 A | 11/1997 | Timm et al. |
| 5,691,726 A | 11/1997 | Nichols et al. |
| 5,736,961 A | 4/1998 | Fenton et al. |
| 5,781,101 A | 7/1998 | Stephen et al. |
| 5,831,577 A | 11/1998 | Nichols et al. |
| 5,890,061 A | 3/1999 | Timm et al. |
| 5,923,287 A | 7/1999 | Lennen |
| 6,002,362 A | 12/1999 | Gudat |
| 6,078,283 A | 6/2000 | Bednar |
| 6,085,090 A | 7/2000 | Yee et al. |
| 6,097,337 A | 8/2000 | Bisio |
| 6,097,345 A | 8/2000 | Walton |
| 6,111,540 A | 8/2000 | Krasner |
| 6,150,980 A | 11/2000 | Krasner |
| 2001/0014597 A1 * | 8/2001 | Takiguchi et al. ........... 455/343 |
| 2002/0003493 A1 * | 1/2002 | Durst et al. ............. 342/357.07 |
| 2002/0068587 A1 * | 6/2002 | Chapman ..................... 455/461 |

FOREIGN PATENT DOCUMENTS

| | | |
|---|---|---|
| US | 6097337 | 8/2000 |
| US | 6097345 | 8/2000 |
| US | 6111540 | 8/2000 |
| US | 6150980 | 11/2000 |

* cited by examiner

*Primary Examiner*—Dao Phan
(74) *Attorney, Agent, or Firm*—Damian Parcari

(57) ABSTRACT

A system and method for providing information related to geographical sites based on position coordinates of a user information retrieval device. The user information retrieval device includes a positioning system unit, a transmitter, a receiver, and a user interface. The positioning system unit determines the position of the user information retrieval device and the transmitter transmits the position coordinates to a remote computer over a wireless network. A processor in the remote computer gathers information relating to geographical sites within a given distance of the position coordinates of the user information retrieval device. A transmitter in the remote computer transmits the information relating to the geographical sites to the user information retrieval device.

19 Claims, 5 Drawing Sheets

SYSTEM AND METHOD FOR RETRIEVING INFORMATION USING POSITION COORDINATES

BACKGROUND OF INVENTION

1. Technical Field

The present invention relates to a system and method for retrieving information based on telematics, and more particularly, retrieving site specific and time specific information based on coordinates of a user information retrieval device.

2. Background Information

Persons not closely familiar with the history and culture of their own local communities, much less that of distant locations they may visit or pass through, will find their travel time much more fulfilling if they are able to gather information on the various surrounding locations. One system available for providing such information is described in U.S. Pat. No. 5,767,795 to Schaphorst. The Schaphorst system is an electronic tour guide designed to overcome the monotony of an automobile trip. The system includes a GPS receiver, a computer, and a database of pre-recorded information. These components may be contained in one housing, and may be permanently installed in a vehicle. The database contains information pertaining to various geographical regions. The computer receives a signal from the GPS indicating the position of the vehicle. The computer then retrieves information from the database corresponding to the position determined by the GPS receiver. The information is presented to the traveler either on a video display or through an audio playback unit. The system can thereby provide information on the history, geography, and/or culture relating to the region through which the vehicle is traveling. The information can be modified to include specific reference to points of interest with respect to the instantaneous position and orientation of the vehicle.

Still, such a system has several disadvantages. For example, the database(s) holding information that relates to one's location is stored locally on the device located with the vehicle. Thus, up-to-date information on current and/or future events may not be accurate. In addition, the system does not provide a filter for customizing retrieved information for a user based on the user's preferences. Thus, a user can be given unnecessary information, thereby causing the user to become disinterested in receiving any information.

Thus there is a need for an information retrieval system that allows a person to obtain up-to-date site specific information, as well event specific information based on position coordinates.

SUMMARY OF INVENTION

The present invention solves the problems associated with the prior art, such as the Schaphorst system. The present invention is a user information retrieval device for retrieving information from one or more remote databases in an information retrieval system based on position coordinates of the user information retrieval device. The user information retrieval device includes a positioning system unit, a transmitter, a receiver, and a user interface. The positioning system unit is configured to determine the position coordinates of the user information retrieval device. The transmitter is configured to transmit the position coordinates to a remote computer over a wireless network. The receiver is configured to receive information from the remote computer over the wireless network. This information can include information about one or more geographical sites within a given distance from the position coordinates of the user information retrieval device, as well as temporal or time sensitive information related to the one or more geographical sites. The user interface is configured for providing the received information to a user.

Thus, the present invention provides a user with information relating to geographical sites in a given area, thereby educating the user about the surrounding area. The received information can include historical, cultural, geological, related location specific information, as well as other information. In the preferred embodiment, the received information includes temporal specific information relating to one or more of the geographical sites. For example, the received information not only includes information about a civil war site but the starting time and location of a historical re-enactment that is being held, or the time and location for the next tour at given site. To further assist the user, the received information can also include one or more maps or directions informing the user where the user is with respect to the one or more geographical sites. In addition, the received information can also contain advertisements related to the position coordinates, such as an advertisement for a local restaurant or local lodging.

The remote computer, in response to receiving position coordinates for a user information retrieval device, retrieves information from one or more remote databases in an information retrieval system based on the position coordinates of the user information retrieval device. The remote computer includes a receiver, a processor and a transmitter. The receiver is configured for receiving the position coordinates from at least one user information retrieval device over a wireless network. The processor is configured for retrieving information related to one or more geographical sites, as well as time sensitive information related to the one or more geographical sites from one or more databases based on the position coordinates of the user information retrieval device. The transmitter is configured for transmitting the information over the wireless network to the user information retrieval device which sent the position coordinates.

The one or more databases contain information related to one or more geographical sites. In a preferred embodiment, the one or more databases also contain time sensitive information related to the one or more geographical sites. Also in a preferred embodiment, the one or more databases are preferably part of a distributed system. As a result, the user is able to receive up-to-date information. In a preferred embodiment, the one or more databases are located remotely from the remote computer. Therefore, the user information retrieval devices do not need a complete information storage and retrieval system (e.g., computer), including a limited, pre-packaged database (e.g., CDROM).

BRIEF DESCRIPTION OF DRAWINGS

The accompanying drawings, which are incorporated in and form part of the specification, illustrate the present invention when viewed with reference to the description, wherein.

DETAILED DESCRIPTION

Figure 1:
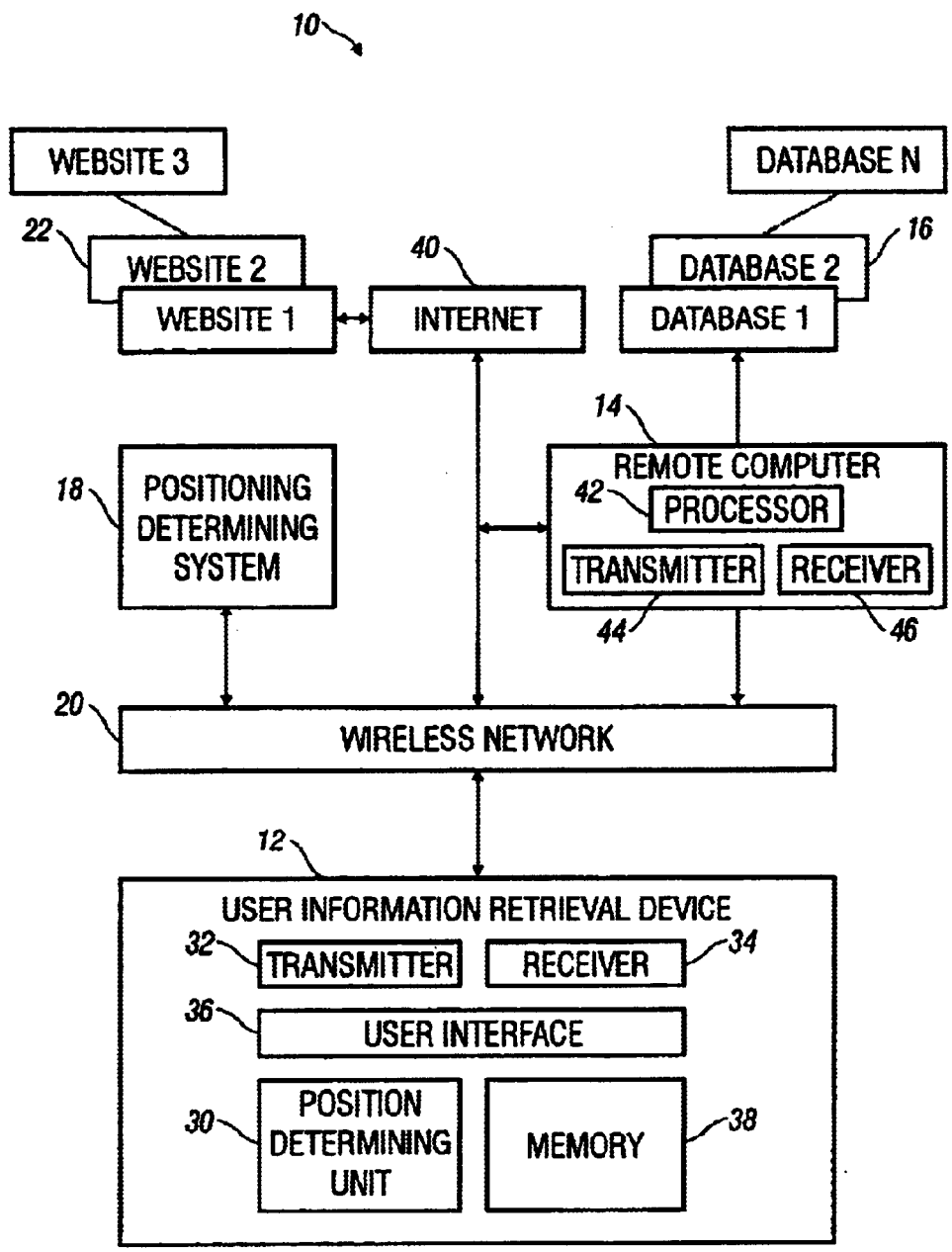
FIG. 1 is a block diagram of an information retrieval system in accordance with an embodiment of the present invention.

Referring to the FIG. 1, a block diagram of an information retrieval system in accordance with an embodiment of the present invention is illustrated. The information retrieval system 10 includes a user information retrieval device 12, a remote computer 14, one or more databases 16, a position determining system 18, and a wireless network 20. As illustrated, the user information retrieval device 12 comprises a positioning system unit 30, a transmitter 32, a receiver 34, a user interface 36, and memory 38.

The positioning system unit 30 is configured to determine the position coordinates of the user information retrieval device 12, which can be accomplished in various ways known to one skilled in the art. For example, in one embodiment the positioning system unit 30 uses a global position system (GPS) 18 which interacts with two or more satellites to determine the position of the user information retrieval device 12. In another embodiment, the positioning system unit 30 uses a positioning determining system (towers or base stations) 18 in a wireless network 20 to determine the position of the user information retrieval device 12. In yet another embodiment, the positioning system unit 30 uses a navigational system 18 in a vehicle, such as WINCAST™. In alternate embodiments, other positioning systems are utilized.

The transmitter 32 is configured to transmit position coordinates for the user information retrieval device 12 to the remote computer 14. In addition, the transmitter 32 can also transmit information to the positioning determining system 18 if needed. The transmitter 32 communicates through the wireless network 20. Examples of wireless networks 20 include but are not limited to cellular networks, satellite networks, the Internet, and other wireless networks. In some embodiments, the wireless networks are connected to land-based networks.

The receiver 34 is configured to receive information from the remote computer 14. In addition, the receiver 34 can also receive information from the positioning determining system 18 if needed. The receiver 34 receives information through the wireless network 20 as described above with respect to the transmitter 32.

Figure 2A:
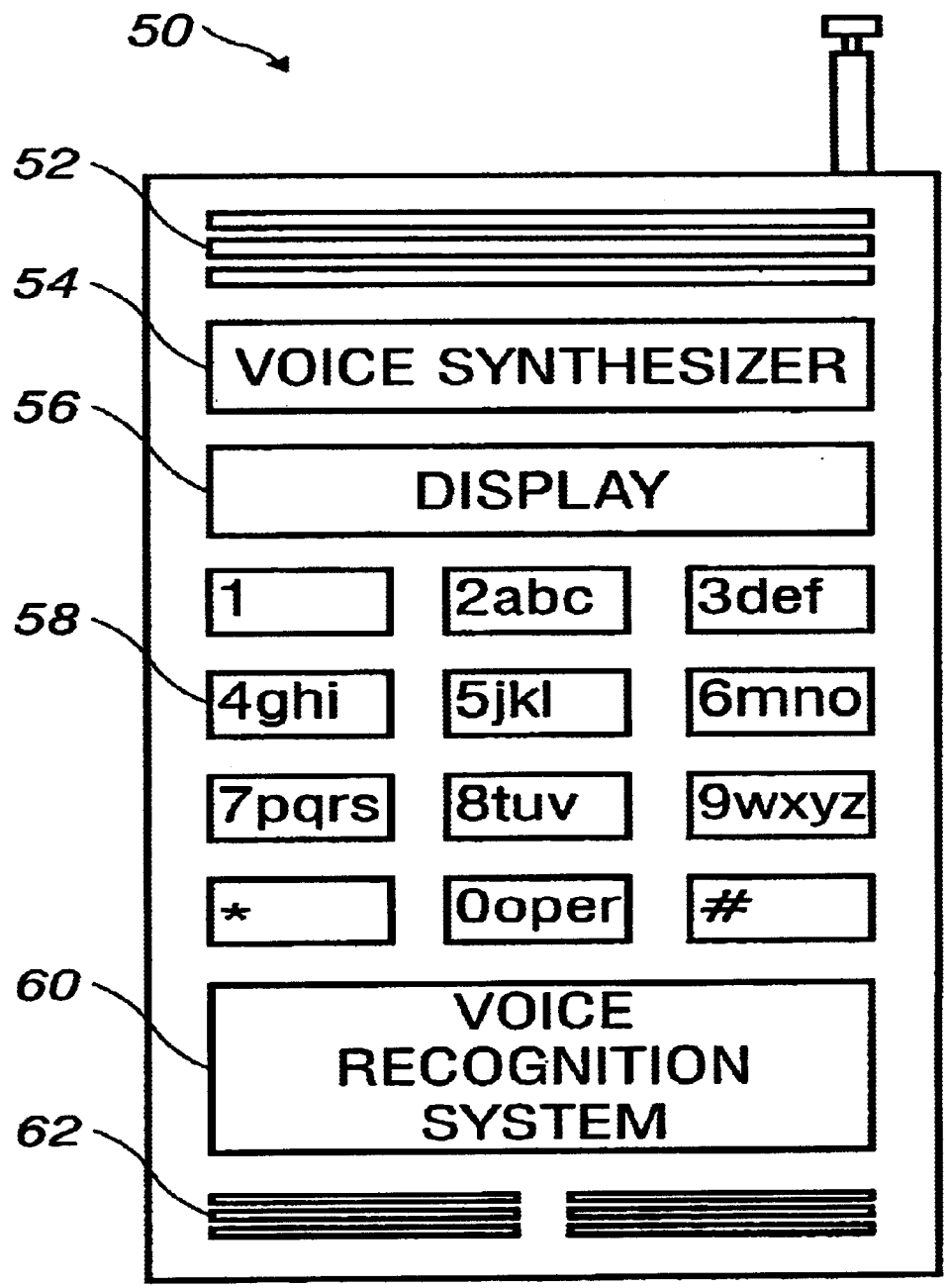
FIG. 2A is a block diagram of an exemplary wireless telephone in accordance with an embodiment of the present invention.
Figure 2B:
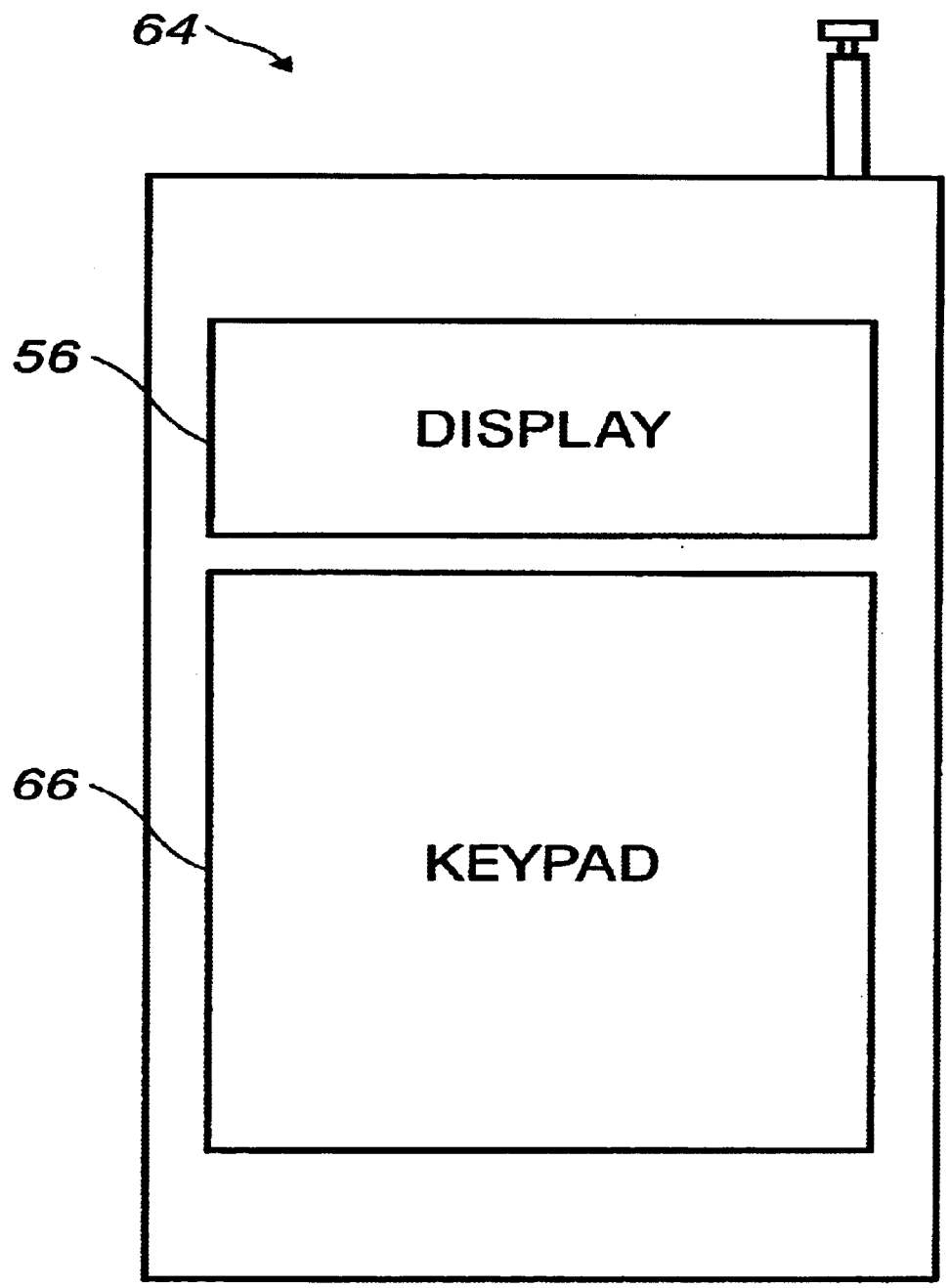
FIG. 2B is a block diagram of an assistance (PDA) in an embodiment of the present invention.
Figure 2C:
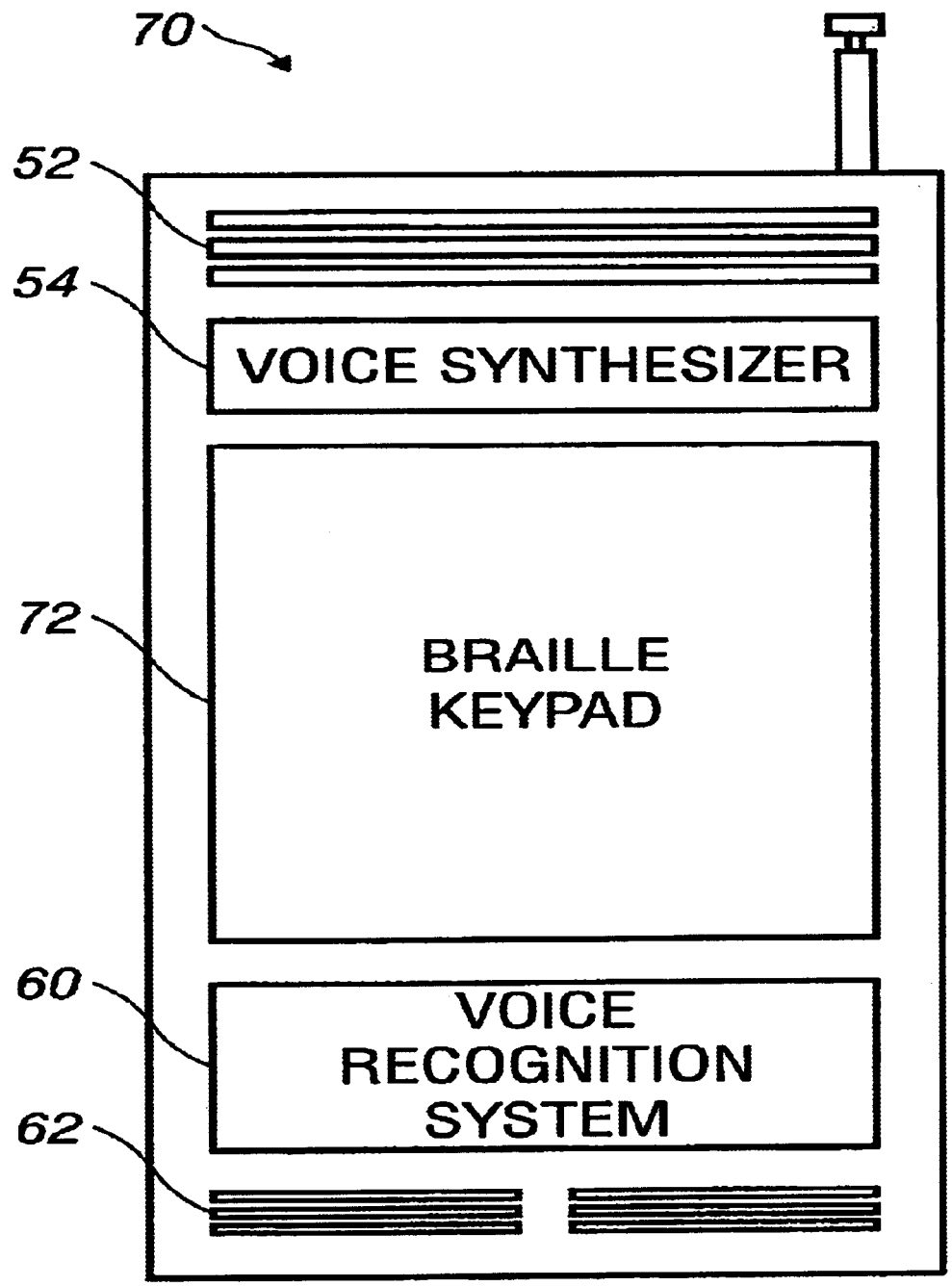
FIG. 2C is a block diagram of an exemplary Braille user information retrieval device in accordance with an embodiment of the present invention.

Referring to FIGS. 2A–2C, exemplary user information retrieval devices in accordance with embodiments of the present invention are illustrated. The user information retrieval device 12 is able to determine or receive position coordinates for the user information retrieval device 12, provide the position coordinates to the remote computer 14 (FIG. 1), receive information from the remote computer 14 and provide the received information to the user. As illustrated in FIG. 2A, an exemplary user information retrieval device is a wireless telephone 50, such as a cell phone, radio phone or satellite phone. In the preferred embodiment, the wireless telephone 50 includes audio components 52, 54, 60, 62 for providing a hands free system as well as a display 56 for displaying the received information. The audio components include a speaker 52 and a voice synthesizer 54 for playing the received information and a microphone 62 and a voice recognition system 60 for receiving verbal commands from a user. A keypad 58 can be used to enter commands from the user, with the transmitter 32 transmitting the commands to the remote computer 14.

As illustrated in FIG. 2B, another exemplary user interface device is a personal digital assistant 64. The PDA 64 includes a display 56 for displaying the received information which can include graphics and/or text. The PDA 64 can include a keypad 66 for entering commands. In another embodiment, the PDA also includes audio components as disclosed above with the wireless phone. Thus, the PDA is also able to operate in a hands free mode.

As illustrated in FIG. 2C, the exemplary user interface device is a Braille user information retrieval device 70. The Braille user information retrieval device 70 can also include audio components 52, 54, 60, 62 for hands free operation of the user information retrieval device. The Braille user information retrieval device 70 includes Braille keypad 72 for entering commands, with the transmitter 32 transmitting the commands to the remote computer 14.

Although not shown but discussed above, the user information retrieval device 12 can also be a navigation system, e.g., a navigation system such as WINCAST™ that also provides hands free operation. In an alternate embodiment, the user information retrieval device 12 in a vehicle can be removable, thus allowing the user to use the user information retrieval device 12 while in the vehicle and also while touring a site.

Referring again FIG. 1, the remote computer 14 comprises a processor 42, a transmitter 44 and a receiver 46. The receiver 46 is configured to receive the position coordinates from the user information retrieval device 12 via the wireless network 20. The processor 42 is configured to access one or more databases 16 for gathering information relating to one or more geographical sites within a given distance of the position coordinates for the user information retrieval device 12. Again, the gathered information can also include time sensitive information related to the one or more geographical sites. The transmitter 44 is configured to transmit the retrieved information to the user information retrieval device 12 over the wireless network 20. The user information retrieval device 12 receives the information via the receiver 34. The user interface 36 presents the received information to the user.

The processor 42 searches the one or more databases 16 to gather information concerning one or more geographical sites within a given distance of the user information retrieval device 12. This is accomplished using the position coordinates of the user information retrieval device. The processor 42 chooses a given distance around the position coordinates to search for geographical sites within the radius of the given distance. The processor 42 adjusts the given distance based on the amount of information the processor 42 gathers from the one or more databases 16. For example, if the user information retrieval device 12 is in a city such as Washington, D.C., the amount of information retrieved is significant compared to the amount of information retrieved in rural parts of the United States for the same given distance. Thus, in some cases, the processor limits the information transmitted to the user information retrieval device using parameters. Limiting the amount of information to the user can be accomplished in various methods.

One method of limiting the amount of information is for the processor 42 to reduce the given distance around the position coordinates. Similarly, the processor 42 can also only provide information for sites located in the direction the user information retrieval device 12 is heading. In addition, the processor 42 can provide the user with a list of geographical sites and the user can select one of the geographical sites using commands. Thus, the processor 42 would then provide additional information to the user information retrieval device 12 based on the selection by the user.

In a preferred embodiment, the user can limit the amount of information that the processor 42 gathers by entering parameters in a user profile associated with the user information retrieval device. The user profile can be stored in the memory 38 of the user information retrieval device 12, in memory within the remote computer 14, in a database 16, or in another memory medium.

In a preferred embodiment, the remote computer 14 uses parameters from the user profile to limit the amount of information being sent to a user information retrieval device 12. Thus, the parameters would have corresponding headers or tags associated with the data in the one or more databases 16. As a result, the user profile can guide the content received from the remote databases 16. For example, a user may be interested in historical sites and landmarks. If the user were traveling in downtown Washington, D.C., the location combined with the user profile would result in retrieval and display of certain information. For example, the database might have entries for both the Washington Monument and the White House. The user would receive this information at the appropriate time and location. If the user profile also specifies that the user is interested in events near the present location, the processor 42 would search the one or more databases 16 for events related to the sites. For example, the processor 42 would provide the user information retrieval device 12 with information about a free concert on the Mall near the Washington Monument. Event information is typically time specific information, thus using a distributed system allows for this information to be up-to-date. Similarly, if a user requests "local history", the processor 42 would search the one or more databases 16 for data labeled "local history." In addition, the retrieved information may be customized, for example, to give priority to topics included in a user profile, or in response to commands from the user. Hence, the position coordinates coupled with the user profile determines the priority of information retrieved by the system.

In a preferred embodiment of the present invention, the one or more databases 16 are remotely located away from the remote computer 14. The one or more databases 16 contain information related to geographical sites, and preferably contain time sensitivity or temporal information related to one or more geographical sites. The information contained in the one or more databases 16 can include historical, cultural, geological, related location specific information, as well as other information. However, in order to search the one or more databases 16, the data is stored using position coordinates. In addition, the processor 42 also needs to be able to filter the data as needed. For example, if the processor 42 is providing a list of sites to the user information retrieval device 12, the processor 42 needs to provide the user informational retrieval device 12 with short identifiers of the sites. As a result, the data in the one or more databases 16 includes headers, as well links to additional information. Thus, in a preferred embodiment the processor 42 includes searching software and the one or more databases 16 are specially structured to allow for dynamic retrieval of information based on the position coordinates of the user information retrieval device 12 as well as other parameters.

In an alternative embodiment, the one or more databases also contain links to other resources. For instance, if there is an event scheduled for a selected site of interest, the schedule may not be finalized when the item is entered into the database. In this case it may be useful for a pointer to the event's website 22 to be imbedded in the information returned to the user. In this case, the user is able to access one or more websites 22 via the Internet 40. In this way, the user can retrieve the most recent information available for a given item of interest. Alternatively, the link could be to one of the integrated databases, rather than an external resource.

In an alternative embodiment, the system and method utilizes an integrated distributed database containing knowledge constructs. Other abstracting and indexing services are essentially information retrieval tools. A fact based knowledge base focuses on statistics, dates, and other numerical content, which makes it possible to develop inter-relationships based on hard facts. This type of knowledge base may emphasize social, economic, political, environmental, and health issues and their inter-relationships. An alternative knowledge base is designed to accomplish this with "soft" content: history, biography, personal narrative, etc. In many respects, this is more important content than hard facts, but it is more difficult to establish a structure that will make it possible to retrieve content at the "correct" level for each user at the moment he/she seeks it, while at the same time providing the infrastructure and content to help a person explore a topic at much greater depth: to trace relationships, to explore the ripple effect of actions, in short, to go where understanding and knowledge begins. This alternative knowledge base provides information when that is all that a person seeks, but also provides the infrastructure and content to convey understanding and knowledge whenever possible.

The alternative non-factual knowledge base is an interactive, multi-level, encyclopedic knowledge base, grounded in human experience and featuring search guides, navigation tools, internal hyperlinks, external Web links, linkages to historic sites and resources, and card catalog integration. It draws upon and incorporates diverse resources, including books, periodicals, booklets, pamphlets, guides to historic sites, and Web-based resources such as searchable databases, video clips, and sound files, etc.

The user can easily search the database, revising, narrowing, or expanding a search at any point. However, here the database is heavily dependent on the power and features of systems on which the database is loaded. The database contains several different categories of materials, but all can be searched at once, or portions can be searched separately; linkages in one section may interact with specific portions of other sections. For example, an entry on George Washington may link to "Hyperquotes", a textual quote associated with a hyperlink, by George Washington. These Hyperquotes have Web links to the full text of the speeches and/or other sources of the quotes so they can be seen in full context. The Hyperquotes also function as keyword indexes to these external speeches, etc.

The database records link interactively to external resources, such as Web sites, just by clicking on an entry.

The database contains records of different length, reading comprehension, and thoroughness in order to provide focused content for users ranging from elementary schools to academic libraries. Reading level is indicated in each record by two separate sets of codes: one at the record level, and one at the subject heading level.

In one embodiment, a tag in the record structure indicates the age reading level range for that record, e.g., 008–012

(8–12 years of age). Where appropriate, these code ranges are determined in cooperation with the publishers of the literature covered by the database.

Subject headings contain additional tags. For instance, the codes K2, K6, K9, and/or 7 up are included to make it possible to perform either a subject or a keyword search for a specific topic, and to restrict the search results to entries appropriate for a defined reading level. Many records contain combinations of these codes. For example, an entry from a children's magazine suitable for ages 4–12 would contain the three codes: K2 K6 K9. To obtain materials on the Armenian Genocide suitable for high school and academic usage, the keyword or subject search would be: "armenian genocide 7up". Thus, the database can be provided all schools in a district, from elementary through high school, and age appropriate content can be obtain at every level. Likewise, a public library can support both adults and children with the database, setting a "default" from the children's department to search first for content on any specified subject AND K2 K6, while other library access points might have a "default" set to search first for content on any specified subject AND K9 7 up. One should note that the default settings are dependent on the user profile providing access to the database, but the coding to make this work is contained in each database record.

Level, length, and thoroughness of treatment also are reflected in "unique" terms added to subject headings. An effort is made to correlate these unique terms to the reading levels mentioned above. A person may add the unique word "brief record" when he or she wants an entry that will provide a quick introduction to a topic, or "intro record" when he/she wants intermediate treatment, or "anchorecord" when he/she wants to cover a topic much more thoroughly. Brief records are normally worded simply enough to be useful at the K2 level as well, while intro records generally will be useful at the K6 and K9 levels, and anchorecords generally reflect the needs and abilities of persons at K9 and 7 up levels.

Emphasis is placed on building "pairs" and "sets" of relationships. For example, where a work about a person (a biography) is added to the database, one or more works by that person also may be added. Along with a work about Booker T. Washington is loaded his autobiography, "Up From Slavery", as well as his famous Atlanta speech. A work about Frederick Douglass is included along with his first autobiography, "Narrative" (1845). A significant biographical entry on Geronimo is paired with his autobiography.

Conversely, there are certain limitations with autobiography—they tell only what persons want known about their lives and/or interpret events the way they want them to be seen and remembered. Where content is known to be inaccurate or one-sided, as, for example, in portions of the autobiography of Andrew Carnegie, one or more separate entries will be prepared that will provide more accurate or alternative perspectives on an issue, such as working conditions and the subsequent massive and violent strike at Carnegie's Homestead steel mill. Linkers are imbedded between these respective sources.

The biographies and autobiographies added to the database are re-edited for improved readability and comprehension for today's reader. These resources are viewed as new manuscripts being submitted by the authors for first-time publication, and are re-edited almost as heavily as other truly "original" additions to the database are edited. Biographies and autobiographies are meant to facilitate learning and understanding today, rather than textual analysis. For those who need access to the original versions, Web links are provided to Web versions, when they exist, and/or encoded searches are imbedded in the database records to point to the original print version of the book in a local library.

The database includes records designated as "Masterecords", "Linkerecords", "Hyperlists", and so on. Masterecords contain an extensive introduction to the topic and may contain "tables of contents" of other records in the database related that topic (e.g., history of Vietnam). Many masterecords also include chronologies on their topics. Linkerecords contain pre-programmed searches. Simply by clicking on entry, the pre-programmed instructions will be activated (e.g., retrieve "priority" records on Abraham Lincoln). Other features of Linkerecords will be discussed later. Hyperlists show in context persons and events that lend themselves to "list building" (e.g., all presidential elections and election results including both popular and electoral votes, with links to further information about specific candidates).

The coding structures and unique terms imbedded in records, as previously noted, make it possible to retrieve content by subject, readability level, depth of treatment, and special characteristic (e.g., personal narratives). Many "ordinary" records provide pointers to related content.

A second category of tools provides links to external Web-based resources, including search engines at specialized sites, in order to facilitate additional exploration and research on related topics. For example, a record in the database provides access to the search engines for the U.S. Congressional Record as well as the Hansards for Great Britain, Canada, and Australia.

The Hypertext markup structure facilitates precise linkages to other records, as well as, declarative retrieval (e.g., all entries categorized as "anchorecords" related to the first amendment to the U.S. Constitution). These linkers can be to content in the main database and/or content in other databases, as well as to holdings in a card catalog.

All these linkers are coded to activate simply by clicking on "anchored text". Two kinds of Web links are built into the database. These are "linked URLs" and "searchable URLs".

Linked URLs connect directly to specific resources, such as the full text of a historic document (e.g., Lincoln's Gettysburg Address) or a home page devoted to a specific topic (e.g., mammals). A special category of "linked URLs" are "Map links," which retrieve selected maps or dynamically construct customized maps, drawing on the cartographic database of the Bureau of the Census Tiger Map Service.

Searchable URLs link to content on a topic, including all new materials that are added to the Web after the URL has been constructed (e.g., all the full-text works on the Web by Nathaniel Hawthorn, or all statements and resources entered into the Congressional Record on the subject: "guns and youth").

Both categories of Web links work automatically, simply by clicking on them. Linkages to Historic Sites and Resources are featured; historic sites, museum resources, and living history simulations can greatly facilitate discovery and experiential learning. They are important components of and extensions to a knowledge base. Increasingly, as core content on a topic is added to the database, related physical sites and resources will be described and included as well.

A primary objective of the main database is to make it possible for a person planning to travel a specific route in a defined direction to retrieve records on a precise subject up to a specified number of miles off that route. For example, if a person is driving from east to west along I-80 and would be willing to drive up to 20 miles off I-80 to sites dealing with "early exploration and settlement", then those qualifying sites should be displayed and/or printed out in descending order going from "east to west". For instance, if a person plans to fly to Nashville and would like to visit Civil War sites up to 40 miles outside Nashville, the appropriate list should be printed in some logical sequence, perhaps by subtopic or direction from Nashville.

To accomplish this objective, the longitude and latitude of each site must be included in all pertinent records, along with subject descriptors and proximity information to roads, towns, etc. The software at the user site which supports this database has the ability to handle these disparate component parts as well as the ability to sort and display entries in appropriate directional sequence.

In an alternative embodiment, card catalog interaction is implemented. Card catalog integration is facilitated in two ways.

First, entries are encoded to automatically conduct a search of a card catalog to see if a specified book or books on a defined topic are in the card catalog. These entries are encoded as "searchable anchors", which means that in order to avoid false links, the anchor is not revealed if the target entry is not available in the catalog. For example, the instruction to search the card catalog for Nina Kossman's book, "Behind the Border", is encoded as follows:

<SA HREF="DB=CAT:FLDIXX=nina kossman+FLD245=behind border"> . . . </SA>

This coding structure tells the system to search the card catalog author index for the keywords "nina" and "kossman" and simultaneously to search the title index for the keywords "behind" and "border", and to let the system know if this combined search is successful. If successful, then the system strips the "S" out of the <SA and </SA> portions of this anchor, revealing the existence of a functional link to the card catalog. If the entry does not exist in a card catalog, the coding remains unaltered, and the user does not even know that this unsuccessful search was conducted. Local online public access catalogs can be easily upgraded to handle this feature.

Second, a large group of records in the database linkerecords contain Web links as well as imbedded instructions to retrieve specified content from a database. These records can reside on the card catalog so that a search of the card catalog for a specific topic will simultaneously retrieve Web sites and content on that topic.

"Linkerecords" also contain imbedded instructions for searching the card catalog. As a result, linkerecords literally function as "integration central" between the database and the catalog, and vice versa. Thus, whether a search is initiated in the card catalog or in the database, resources in the other are brought to the attention of the searcher along with quality Web resources.

It would be apparent to one skilled in the art that various database schemes and associated search engines could be used to provide content to the present invention. The selected user profile and temporal location specific information, combined with the available content, drive the usefulness of the system. A user might be interested only in being fed historic information. Another user might want to exercise the full interactive nature of the system to follow links to corresponding Web pages, after viewing (or listening to) the initially provided content.

In an alternative embodiment, advertisements are sent to the user along with the requested information. For instance, restaurant information for a geographic area might be sent along with the historic site information. The use of advertisements would subsidize some of the costs associated with gathering information for the database, thus, providing a more robust system.

In another embodiment, the processor 42 is able to generate maps of a geographic location, which is then overlayed with historical markers and travel information. Alternate routes to the displayed sites may be shown, as well as delays expected for certain routes. Further, the user may change his/her profile to expand or narrow the radius of search by degrees or seconds of longitude/latitude (from the current geographic location). The user may also specify a fixed location in the profile which supercedes the location determined by the positioning determining system 18.

Figure 3:
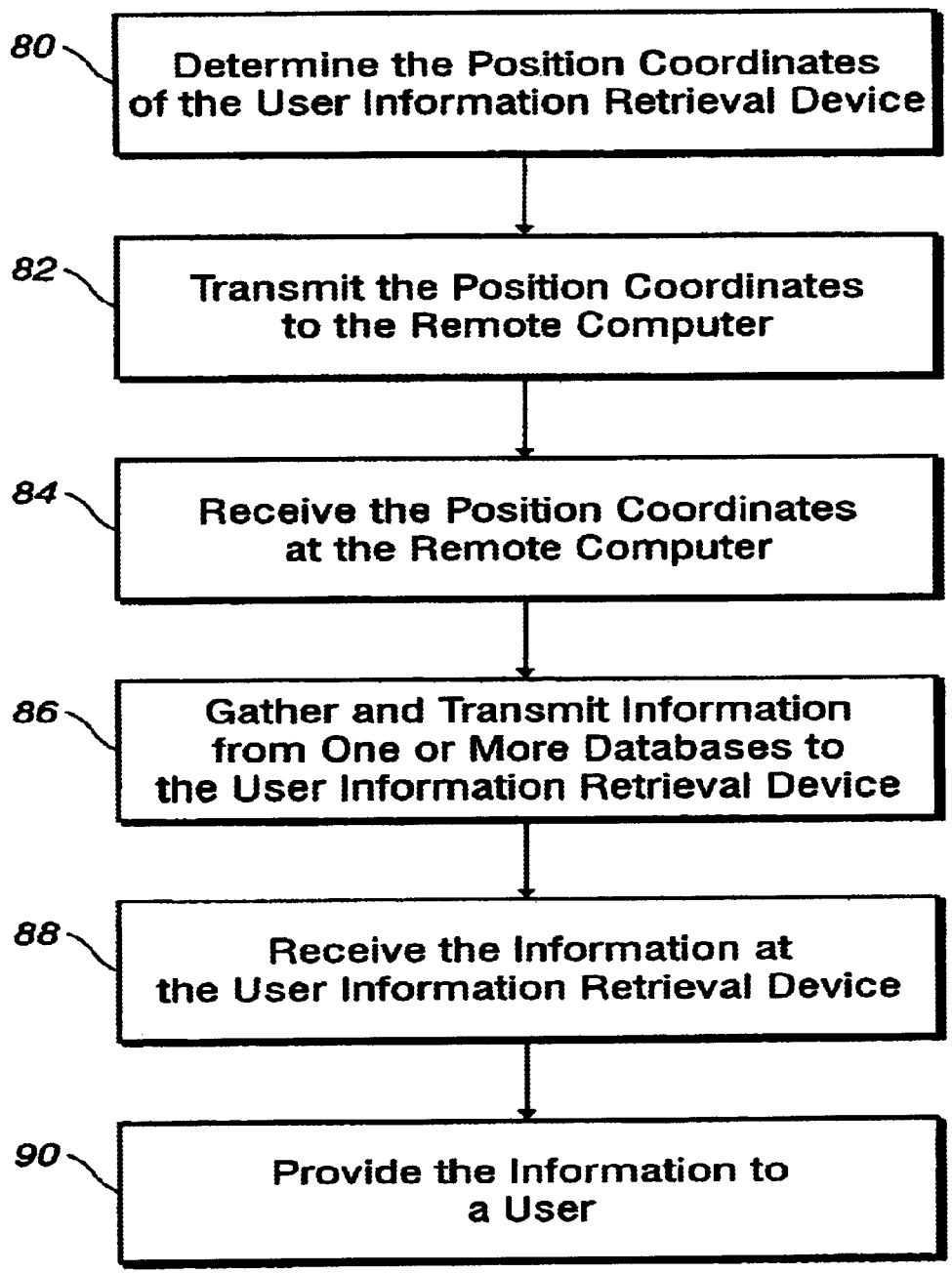
FIG. 3 is a flow chart illustrating the steps of a method implementing an embodiment of the present invention.

Referring to FIG. 3, the steps of a method for retrieving information from one or more remote databases in an information retrieval system based on position coordinates of a user information retrieval device is illustrated. The user information retrieval device 12 determines the position coordinates for the user information retrieval device at step 80. This is accomplished by either the position determining unit 30 calculates the position coordinates of the user information retrieval device 12 or by the user information retrieval device 12 communicates with the positioning determining system using the wireless network 20 requests the position coordinates from the positioning determining system.

Once the position coordinates for the user information retrieval device 12, the position coordinates are transmitted to the remote computer over the wireless network using the transmitter in the user information retrieval device 12 at step 82. The remote computer receives the position coordinates from one or more user information retrieval devices at step 84. The remote computer gathers information from one or more databases 16 and transmits the information to the user information retrieval device over the wireless network using a transmitter at step 86. The user information retrieval device receives the information from the remote computer over the wireless network at step 88. The received information is provided to the user at step 90. The received information can be provided to the user in various forms. For example, the received information is displayed on the display and/or is played on the speaker using a voice synthesizer.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A user information retrieval device for retrieving information from one or more remote databases in an information retrieval system based on position coordinates of the user information retrieval device, wherein the user information retrieval device comprises:

a positioning system unit configured for determining the position coordinates of the user information retrieval device;

a transmitter configured for transmitting the position coordinates to a remote computer over a wireless network;

a receiver configured for receiving information from the remote computer over the wireless network wherein the received information relates to one or more geographical sites within a given distance from the position coordinates of the user information retrieval device; and a user interface configured for providing the received information to a user.

2. The user information retrieval device of claim 1 wherein the user information retrieval device is selected from a group consisting of a wireless telephone and a personal digital assistant (PDA).

3. The user information retrieval device of claim 1 wherein the user interface comprises a display configured for displaying the received information.

4. The user information retrieval device of claim 1 wherein the user interface comprises a speaker and a voice synthesizer configured for playing the received information over the speaker.

5. The user information retrieval device of claim 4 wherein the user interface further comprises a microphone and a voice recognition system configured to receive audio commands via the microphone.

6. The user information retrieval device of claim 4 wherein the user interface further comprises a Braille pad configured for receiving commands.

7. The user information retrieval device of claim 1 further comprising memory for storing a user profile having parameters for limiting the information transmitted to the user information retrieval device based on the parameters.

8. The user information retrieval device of claim 1 wherein the retrieved information contains one or more links for accessing one or more websites using the user information retrieval device, wherein the one or more websites are associated with one or more of the geographical sites.

9. The user information retrieval device of claim 1 wherein the retrieved information contains one or more maps illustrating the position of the user information retrieval device with respect to one or more geographical sites.

10. The user information retrieval device of claim 1 wherein the retrieved information contains temporal event information relating to one or more of the geographical sites.

11. A remote computer for retrieving information from one or more remote databases in an information retrieval system based on position coordinates of a user information retrieval device in response to receiving position coordinates from at least one user information retrieval device, wherein the remote computer comprises:

a receiver configured for receiving the position coordinates from at least one user information retrieval device over a wireless network;

a processor configured for retrieving information related to one or more geographical sites from one or more databases based on the position coordinates; and a transmitter configured for transmitting the information to the user information retrieval device which sent the position coordinates of the user information retrieval device over the wireless network.

12. The remote computer of claim 11 wherein the processor is further configured to filter the information transmitted to the user information retrieval device using parameters in a user profile associated with a user information retrieval device.

13. The remote computer of claim 11 wherein the processor is further configured to obtain temporal event information related to the one or more geographical sites and the transmitter is further configured for transmitting the temporal event information to the user information retrieval device over the wireless network.

14. A method of retrieving information from one or more remote databases in an information retrieval system based on position coordinates of a user information retrieval device, wherein the method comprises the steps of:

determining the position coordinates for the user information retrieval device;

transmitting the position coordinates to a remote computer over a wireless network;

receiving information from the remote computer over the wireless network, and providing the received information to a user, wherein the received information relates to one or more geographical sites within a given distance from the position coordinates for the user information retrieval device.

15. The method of claim 14 wherein the step of providing the received information is selected from the group consisting of displaying the received information on a video display and playing the received information on a speaker using a voice synthesizer.

16. The method of claim 14 further comprising the step of limiting the information transmitted to a user information retrieval device using parameters from a user profile which is associated with the user information retrieval device.

17. A method for retrieving information relating to one or more geographical sites from one or more remote databases in an information retrieval system in response to receiving position information from a user information retrieval device, wherein the method comprises the steps of:

receiving position coordinates from at least one user information retrieval device over a wireless network;

gathering information relating to one or more geographical sites from one or more databases based on the received position coordinates; and transmitting the information to the at least one user information retrieval device over the wireless network.

18. The method of claim 17 further comprising the step of limiting the information transmitted to the at least one user information retrieval device based on parameters from a user profile associated with the user information retrieval device.

19. The method of claim 17 further comprising the step of adjusting the given distance based on the amount of information retrieved for the received position coordinates from the at least one user information retrieval device.

* * * * *